US008676475B2

(12) United States Patent
Cassani et al.

(10) Patent No.: US 8,676,475 B2
(45) Date of Patent: Mar. 18, 2014

(54) METHOD FOR REGENERATING A DIESEL PARTICULATE FILTER

(75) Inventors: Stefano Cassani, Turin (IT); Davide Mercuri, Turin (IT); Simone Barbero, Turin (IT); Pierluigi Rellecati, Cumiana (IT)

(73) Assignee: GM Global Technology Operations LLC, Detroit, MI (US)

( * ) Notice: Subject to any disclaimer, the term of this patent is extended or adjusted under 35 U.S.C. 154(b) by 854 days.

(21) Appl. No.: 12/858,290

(22) Filed: Aug. 17, 2010

(65) Prior Publication Data

US 2011/0066354 A1 Mar. 17, 2011

(30) Foreign Application Priority Data

Aug. 19, 2009 (GB) .................................. 0914497.3

(51) Int. Cl.
*F01N 3/023* (2006.01)

(52) U.S. Cl.
USPC ............. 701/105; 701/104; 123/299; 60/295; 60/300

(58) Field of Classification Search
USPC ............. 123/299; 701/103–105; 60/285, 295, 60/300, 303
See application file for complete search history.

(56) References Cited

U.S. PATENT DOCUMENTS

| 6,901,747 B2* | 6/2005 | Tashiro et al. ................... 60/286 |
| 8,272,362 B2* | 9/2012 | Shane et al. ................... 123/299 |
| 2003/0145581 A1 | 8/2003 | Tashiro et al. |
| 2007/0012031 A1* | 1/2007 | Tanimura et al. ............... 60/285 |
| 2007/0181095 A1* | 8/2007 | Hata .............................. 123/299 |
| 2007/0240675 A1* | 10/2007 | Ban .............................. 123/299 |
| 2008/0295491 A1 | 12/2008 | Kuboshima et al. |
| 2009/0266055 A1* | 10/2009 | Guo et al. ....................... 60/285 |

FOREIGN PATENT DOCUMENTS

| EP | 1541844 A1 | 6/2005 |
| EP | 1584805 A2 | 10/2005 |
| WO | 2009134898 A2 | 11/2009 |

* cited by examiner

*Primary Examiner* — Erick Solis
(74) *Attorney, Agent, or Firm* — Ingrassia Fischer & Lorenz, P.C.

(57) ABSTRACT

A method is provided for regenerating a diesel particulate filter within a diesel engine system that includes, but is not limited to at least a combustion chamber defined by a reciprocating piston inside a cylinder, at least an exhaust valve for cyclically open the combustion chamber towards an exhaust line, and the diesel particulate filter located in the exhaust line, wherein the method comprises injecting an amount of fuel into the combustion chamber by means of least two consecutive after-injection pulses (AIP1-AIP3), each of which starts (SOI) after the piston has passed the top dead center (TDC), and sufficiently near to the latter for the fuel to burn at least partially inside the combustion chamber.

18 Claims, 2 Drawing Sheets

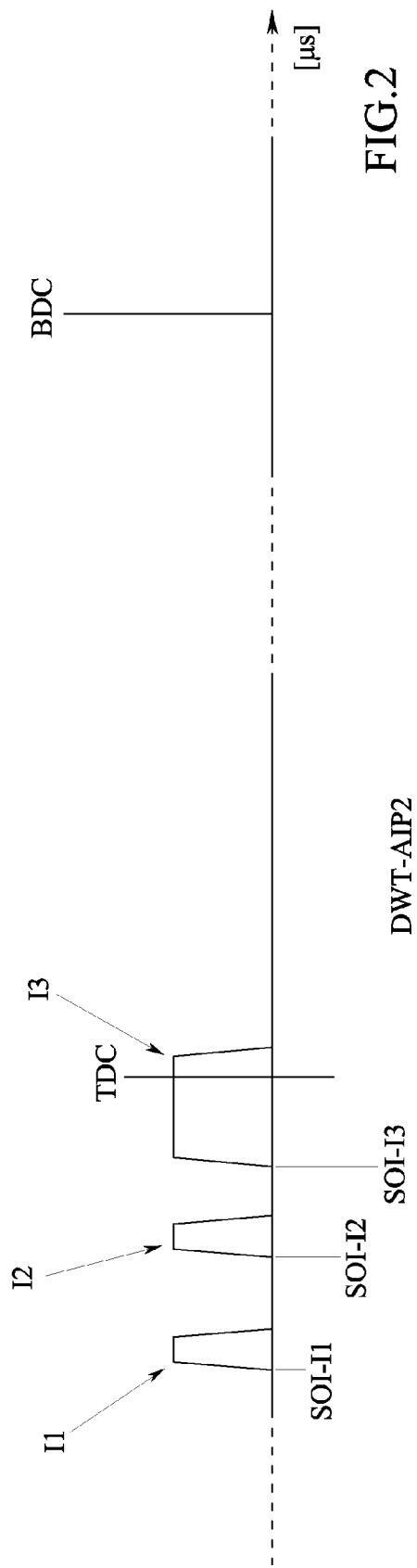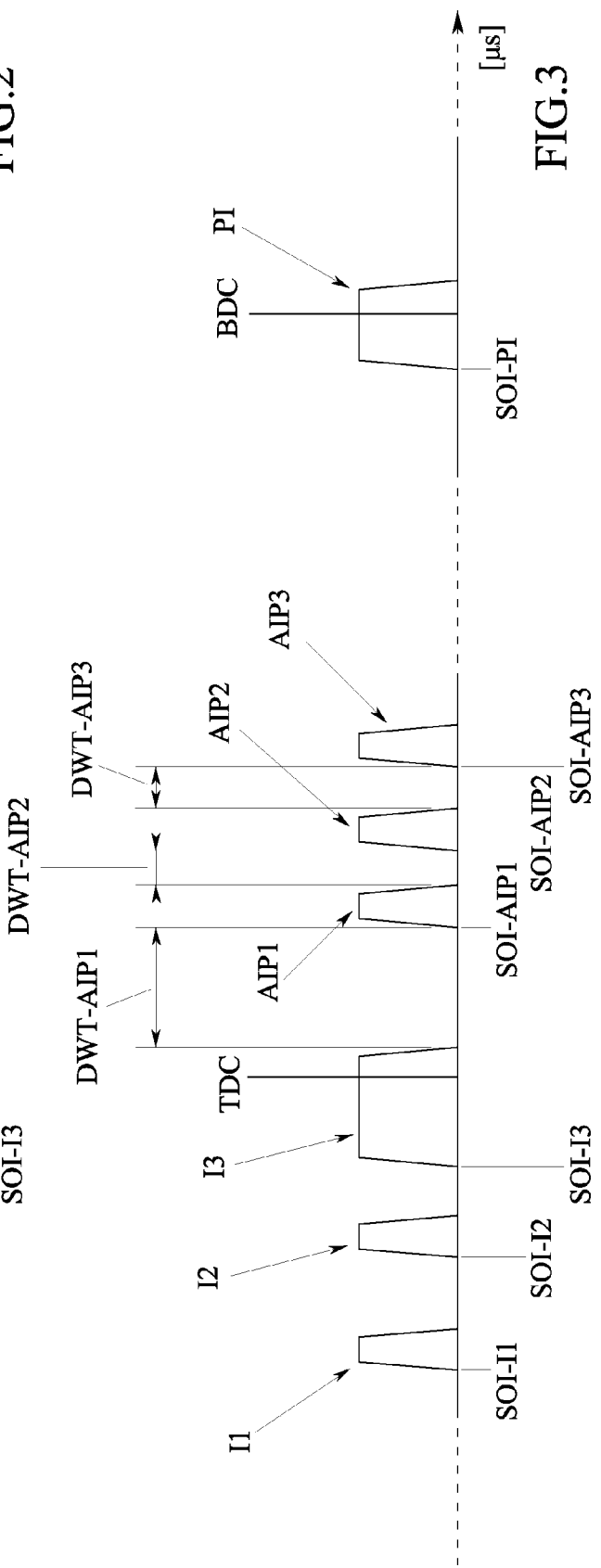

METHOD FOR REGENERATING A DIESEL PARTICULATE FILTER

CROSS-REFERENCE TO RELATED APPLICATION

This application claims priority to British Patent Application No. 0914497.3, filed Aug. 19, 2009, which is incorporated herein by reference in its entirety.

TECHNICAL FIELD

The present invention relates to regeneration of a diesel particulate filter (DPF) within a diesel engine system.

BACKGROUND

A diesel engine system generally comprises one or more combustion chambers which are individually defined by a reciprocating piston inside a cylinder.

The cylinder is provided with one or more intake valves for cyclically opening the combustion chamber towards an intake line for receiving fresh airflow, and with one or more exhaust valves for cyclically opening the combustion chamber towards an exhaust line for discharging the exhaust gases.

The cylinder is also provided with electrically controllable injection means, which are controlled by a microprocessor based controller (ECU), for injecting fuel inside the combustion chamber according to a multi-injection pattern.

During normal engine operation, the multi-injection pattern usually comprises several injections of fuel which follow one another in the time slot between the closure of the intake valves and the instant when the piston reaches its top dead center position (TDC), during the compression stroke.

Such injected fuel burns inside the combustion chamber producing high temperature and pressure gases, whose expansion directly apply force to the piston for moving it towards its bottom dead center position (BDC), in a power stroke which is useful for generating torque at the crankshaft.

The exhaust valves open the combustion chamber nearly when the piston reaches its bottom dead center position, enabling the exhaust gases to flow into the exhaust line during the next exhaust stroke of the piston.

A diesel oxidation catalyst (DOC) is conventionally located in the exhaust line, for degrading residual hydrocarbons and nitric oxides which are formed in the combustion process of the engine and are contained in the exhaust gas flow.

In order to accomplish tighter emission legislation, a diesel particulate filter (DPF) is generally located in the exhaust line downstream the DOC, for capturing and removing diesel particulate matter (soot) from the exhaust gas flow. Usually the diesel particulate filter is joined with the diesel oxidation catalyst forming a single group, which can be located in a closed-coupled configuration or in an under-floor configuration according to the architecture of the exhaust line.

In the closed-coupled configuration, such a group is located near the exhaust manifold of the engine, immediately downstream the turbine of the turbocharger. In the under-floor configuration, such a group is located far from the exhaust manifold, and a diesel oxidation pre-catalyst is usually interposed between the group and the turbine of the turbocharger.

The diesel particulate filters generally comprise a filter body of porous material, with dead-end holes extending into the filter body from opposite sides thereof. In normal operation, exhaust gas enters the dead-end holes from one side of the filter body, and passes through the filter material into the dead-end holes of the other side, whereby the particulate matter carried by the exhaust gas is retained at the surface and in the pores of the filter body. The accumulating particulate matter increases the pressure drop across the filter.

When the pressure drop becomes excessive, it may cause the filter body to crack, rendering the filter ineffective, or it may affect the efficiency of the diesel engine.

In order to avoid excessive clogging of the filter, the particulate matter must be removed when critical amount of it has accumulated in the filter body. This process is generally referred to as regeneration of the diesel particulate filter. Conventionally, regeneration is achieved by heating the DPF to a temperature at which the accumulated particulate matter burns off, leaving the filter body clean again.

It is known to heat the filter by means of a temperature increase of the exhaust gases entering the DPF. This temperature increase (typically up to 630° C.) has to be kept for a certain time (typically 600 seconds) in all possible driving condition (i.e. city driving, highway driving, etc.).

Exhaust gas temperature increase is obtained with a dedicated multi-injection pattern, by means of which an amount of fuel is injected into the combustion chamber after the piston has passed its top dead center position, and the fuel that was injected before is already burnt.

Such late-injected fuel can get a first temperature increase due to fuel combustion inside combustion chamber, and a second temperature increase due to fuel oxidation inside the catalyst (DOC) of the exhaust line.

More particularly, the first temperature increase is achieved by a single injection of fuel which is generally referred to as after-injection. The after injection starts before the exhaust valves opening, and sufficiently near to TDC for the fuel to burn quite completely into the combustion chamber. The combustion of after-injected fuel produces hot gases which are subsequently discharged from the combustion chamber and channeled by the exhaust line to pass through the DPF, whereby the latter is heated.

The second temperature increase is achieved by one or more injections of fuel which are generally referred to as post-injections. Post-injections start sufficiently far from TDC for the fuel to not burn into the combustion chamber, typically after the exhaust valves opening. Therefore, the post-injected fuel is ejected unburnt from the combustion chamber and is channeled by the exhaust line towards the diesel oxidation catalyst (DOC). The diesel oxidation catalyst is effective to oxidize unburnt post-injected fuel, heating the exhaust gases that subsequently pass throw the DPF.

Current strategies for regeneration process are able to achieve the necessary target DPF temperature in most of the engine working condition, which are typically defined in terms of engine speed, engine load and also vehicle speed. However, not all possible engine working condition are actually covered by current regeneration strategies.

For instance, when the engine works in the low-idle condition, current regeneration strategies get a the temperature increase which unlikely can achieve the requested target of temperature upstream DPF (due to very low temperature of the gas upstream DOC), and so the regeneration is not so efficient to completely burn the particulate matter inside the diesel particulate filter in the requested regeneration duration, especially in light application with small displacement engine and especially for under-floor configuration of DPF.

This leads to a regeneration frequency increase and/or to a longer regeneration process, which increase the risk for the regeneration process to be interrupted by driver key-off, and involve many other drawbacks too.

Most common of such drawbacks are: an increased fuel consumption, due to the high amount of post-injected fuel which is used for heating the DPF and which does not generate torque at the crankshaft (since post-injected fuel is oxidized into the DOC); an increased exhaust line thermal stress and an early component ageing (mostly on the Pre Catalyst), due to the fact that the components of the exhaust line are heated for a long time at high temperature; an increased oil dilution, due to the higher amount of post-injected fuel which tends to pass between the piston and the cylinder reaching the engine oil sump; possibility of DPF clogging if regeneration cannot be carried out at all. All these negative effects are typically recognized in and emphasized by specific but very common driving style, especially the city driving style.

At least one aim of the present invention is to improve the current regeneration strategies in order to match the temperature needed for the DPF regeneration in almost all possible engine working conditions, solving or at least positively reducing the above mentioned drawbacks. Another aim of the present invention is to meet the goal with a simple, rational and inexpensive solution. In addition, other aims, desirable features, and characteristics will become apparent from the subsequent summary and detailed description, and the appended claims, taken in conjunction with the accompanying drawings and this background.

SUMMARY

The embodiments of the invention provide a method for regenerating a diesel particulate filter within a diesel engine system. The diesel engine system generally comprises at least a combustion chamber defined by a reciprocating piston inside a cylinder, at least an exhaust valve for cyclically open the combustion chamber towards an exhaust line, and the diesel particulate filter located in the exhaust line.

According to an embodiment of the invention, the method comprises injecting an amount of fuel into the combustion chamber by means of at least two consecutive after-injection pulses, each of which starts after the piston has passed its top dead center position, and sufficiently near to the latter for the fuel to burn at least partially inside the combustion chamber.

In other words, the embodiments of the invention at least differs from the current regeneration method in that the single after-injection of the prior art is split in several consecutive after-injection pulses. The interaction of such consecutive after-injection pulses causes the pulses to sustain each other in the exothermal oxidation reaction of fuel in combustion chamber. Therefore, if compared to the usual single after-injection, the consecutive after-injection pulses increase the heat release in combustion chamber, leading to better combustion efficiency with minor production of unburned hydrocarbon (HC), and to a higher exhaust gas temperature.

Moreover, the last after-injection pulse will be relatively near to the instant when the exhaust valves open the combustion chamber, so that the exhaust gas flow is generally warmer than the exhaust gas flow produced by a single after-injection. As a matter of fact, the after injection split method allows a faster and more effective DPF regeneration process, by means of which it is possible to reduce, oil dilution, and exhaust line thermal stress, as well as the risk of DPF clogging and the risk of a regeneration interruption by driver key-off.

The embodiments of the invention further provide a control system for controlling the DPF regeneration process. The control system comprises controllable injection means for injecting fuel into the combustion chamber, and a microprocessor based controller for controlling said injection means in order to perform the after-injection split method according to the invention.

BRIEF DESCRIPTION OF THE DRAWINGS

The present invention will hereinafter be described in conjunction with the following drawing figures, wherein like numerals denote like elements, and Td:

FIG. 2 is schematic illustration of a portion of a multi-injection pattern, during normal engine operation, which shows the TDC of the piston at the end of a compression stroke, and the BDC of the piston at the end of the subsequent power stroke; and FIG. 3 is schematic illustration of a regenerative multi-injection pattern during DPF regeneration process, in the same portion illustrated in FIG. 2.

DETAILED DESCRIPTION

Figure 1:
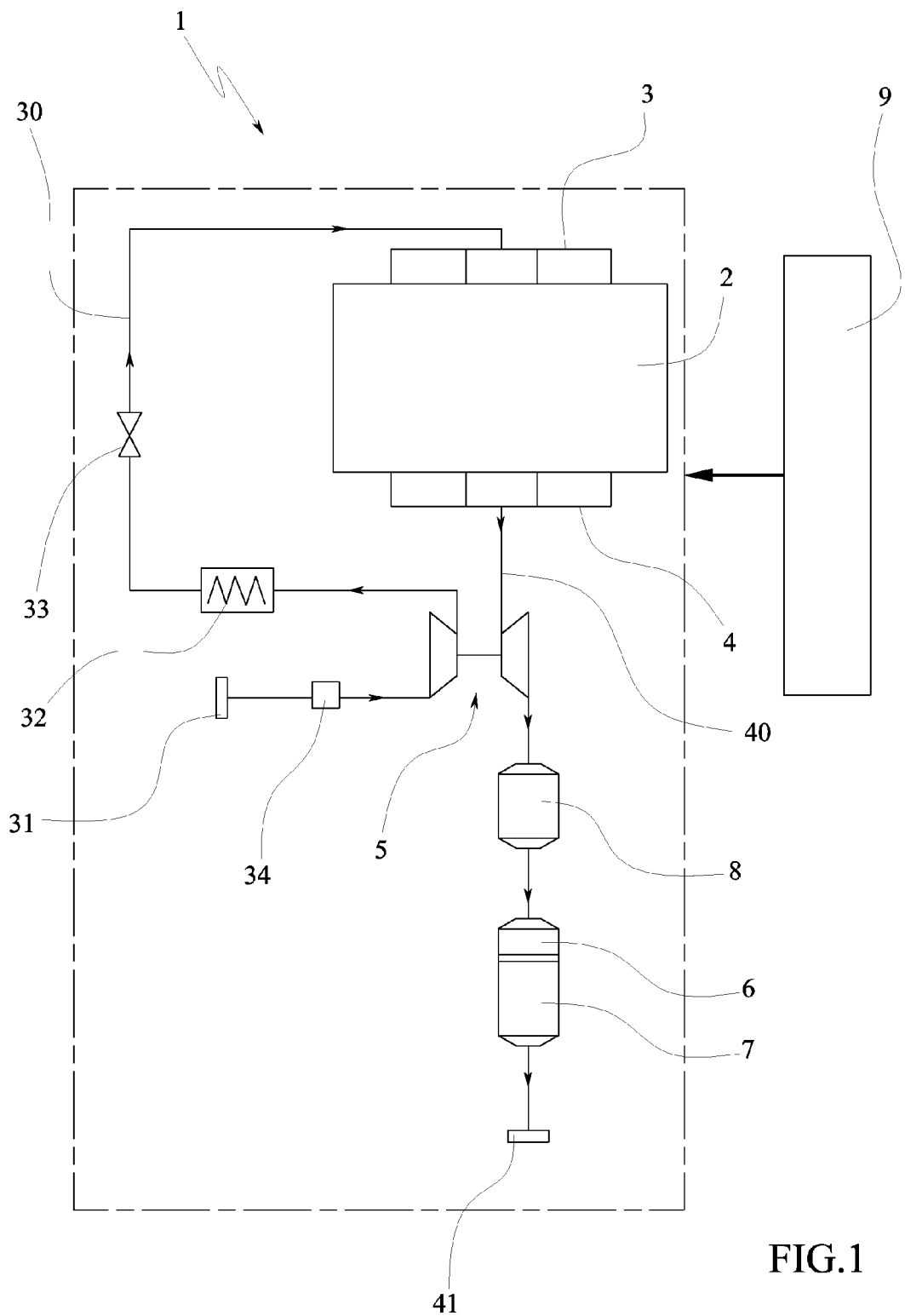
FIG. 1 is a schematic illustration of a diesel engine system and engine controller in accordance with one embodiment of the present invention.

The following detailed description is merely exemplary in nature and is not intended to limit application and uses. Furthermore, there is no intention to be bound by any theory presented in the preceding background or summary or the following detailed description.

A preferred embodiment of the present invention is applied to a turbocharged diesel engine system, which is generally labeled 1 in FIG. 1. The diesel engine system 1 comprises a four-stroke engine 2 having a plurality of combustion chambers which are individually defined by a reciprocating piston inside a cylinder. Each combustion chamber is provided with: one or more intake valves, for cyclically open the corresponding chamber towards an intake manifold 3; one or more exhaust valves, for cyclically open the corresponding chamber towards an exhaust manifold 4; and electrically controllable injection means for injecting fuel into the combustion chamber. Cylinders, pistons, intake valves, exhaust valves and injection means are not shown since they are well known.

Intake manifold 3 is located at the end of an intake line 30, while the exhaust manifold 4 is located at the beginning of an exhaust line 40. Intake line 30 comprises an inlet 31 for aspirating fresh air at substantially atmospheric pressure.

Downstream the inlet 31, a well known turbocharger 5 is located in the intake line 30, for compressing the airflow and for providing it to an intercooler 32. Further downstream, the intake line 30 comprises an intake throttle valve 33 which is electrically controllable for varying the intake restriction. Exhaust line 40 channels the exhaust gases from the exhaust manifold 4 to drive the turbine of turbocharger 5 and thereafter to atmosphere through an outlet 41.

Downstream the turbocharger 5, the exhaust line 40 comprises a diesel oxidation main catalyst 6 (DOC) provided for degrading residual hydrocarbons which are produced by the fuel combustion inside the engine 2, and which are contained in the exhaust gas flow.

A diesel particulate filter 7 is located in the exhaust line 40 downstream the diesel oxidation main catalyst 6, for capturing and removing diesel particulate matter (soot) from the exhaust gas flow, before it reaches the exhaust port 41. In the present example, the diesel particulate filter 7 is joined with the diesel oxidation main catalyst 6 forming a single group, which is located in the exhaust line 40 according to an under-floor configuration. A diesel oxidation pre-catalyst 8 is located in the exhaust line 40 between the diesel oxidation main catalyst 6 and the turbine of turbocharger 5.

The working cycle of the four-stroke engine 2 is hereinafter described with reference to only one combustion chamber. The working cycle is completed in two crankshaft rotations, or four reciprocating movements of the piston into the corresponding cylinder: intake stroke, compression stroke, power stroke and exhaust stroke. The cycle begins when the piston is at its top dead center (TDC), which is the position where the piston is nearest the top of the cylinder.

During the intake stroke, the piston descends from the top dead center to the bottom dead center (BDC), which is the position where the piston is farthest the top of the cylinder. The intake valves are opened, so that fresh air is forced into the combustion chamber. The intake valves close the combustion chamber when the piston is near the bottom dead center.

During the compression stroke, the piston rises from bottom dead center to top dead center, compressing the air into the combustion chamber. The fuel is ignited directly into the combustion chamber at the final stage of the compression stroke, according to a determined multi-injection pattern. The multi-injection pattern is generally represented on a time line, whose principal reference point is the top dead center (TDC) of the piston at the end of the compression stroke. Instead of time, the multi-injection pattern can be expressed in term of angular position the crankshaft.

During normal engine operation, the multi-injection pattern is of the kind shown in FIG. 2. Such multi-injection pattern comprises several injections of fuel, labeled as I1, I2, and I3. The injection pattern is typically located across the top dead center (TDC) of the piston, so that the injected fuel burns quite completely inside the combustion chamber.

The combustion of the fuel inside the combustion chamber produces high temperature and pressure gases, whose expansion directly apply force to the piston for pushing it through the power stroke towards its bottom dead center (BDC), in order to generate torque at the crankshaft. More particularly, the first injections I1 and I2 are generally referred as pre-injections, and are especially useful for raising the temperature inside the combustion chamber in view of the last injection I3, which is the main-injection.

The fuel quantity of the main-injection I3 is higher than the fuel quantity of pre-injections I1 and I2, since the main-injection I3 is generally the most important for generating torque at the crankshaft. The exhaust valves open the combustion chamber when the piston is near its bottom dead center (BDC). During subsequent exhaust stroke, the piston pushes the exhaust gases from the combustion chamber through the exhaust valves and into the exhaust manifold 4. At the final stage of the exhaust stroke, the exhaust valves close the combustion chamber and the cycle starts again.

Integral to the diesel engine system 1 is a control system, which comprises sensing means for providing respective measures of a plurality of engine operating parameters, and a microprocessor based controller (ECU), labeled 9 in FIG. 1.

ECU comprises computer codes for applying the engine operating parameter measures to a plurality of engine control routines. Most important engine operating parameter utilized by ECU in the present invention are engine speed, which is generally expressed in terms of angular speed [rpm] of the crankshaft, and engine load, which is generally expressed in term of engine fuelling [mm3 of injected fuel per cycle] or in terms of engine torque. Other engine operating parameters may be used in the present invention, including important environmental condition parameters, such as ambient air temperature [° C.] from a temperature sensor, ambient pressure [bar] from a barometric pressure sensor, and many other.

One of the most important tasks of the ECU is to determine and regulate the multi-injection pattern on the base of current engine operating parameter measures, and to command and control the injection means accordingly. Another important task of the ECU is to determine the DPF filling level, and to perform the DPF regeneration process once a certain filling level has been reached.

The DPF regeneration process is achieved by increasing the exhaust gases temperature, in order to heat the DPF for a certain time to a high temperature, at which the accumulated particulate matter burns off. Exhaust gas temperature increase involves a dedicated regenerating multi-injection pattern. A regenerating multi-injection pattern according to the invention is shown in FIG. 3.

Apart from the usual pre-injections I1,I2 and main-injection I3, the regenerating multi-injection pattern is provided for injecting a certain amount fuel also after the TDC. Such an amount of fuel comprises the so called after-injected fuel and post-injected fuel.

After-injected fuel is characterized in that it is injected before the exhaust valves opening, and sufficiently near to the TDC for the fuel to burn into the combustion chamber Post-injected fuel is characterized in that it is injected sufficiently far from the TDC for the fuel to not burn into the combustion chamber, typically after the exhaust valves opening.

The regenerating multi-injection pattern according to the invention differs from the ones of the prior art, in that it comprises several consecutive after-injection pulses AIP1-AIP3 instead of a single after-injection. As a matter of fact, the start of injection (SOI) of each after-injection pulses AIP1-AIP3 is located after the TDC and sufficiently near to the latter for the fuel to burn, at least partially and preferably quite completely, into the combustion chamber. In other words, every single after-injection pulse AIP1-AIP3 can be considered a conventional after-injection of the prior art.

The combustion of the after-injection pulses AIP1-AIP3 produces hot gases which are subsequently discharged from the combustion chamber and are channeled by the exhaust line 40 to pass through the DPF, whereby the latter is heated. The interaction of the consecutive after-injection pulses AIP1-AIP3 causes the pulses to sustain each other in the exothermal oxidation reaction of fuel in combustion chamber. Therefore, if compared to the usual single after-injection, such consecutive after-injection pulses AIP1-AIP3 increase the heat release in combustion chamber, leading to better combustion efficiency with minor production of unburned hydrocarbon (HC), and to a higher exhaust gas temperature.

Most important parameters in controlling the after-injection pulses are: number of pulses, total quantity of fuel injected by all pulses, single quantity of fuel injected by each pulse alone, and pulses position in the regeneration multi-injection pattern. The position of each after-injection pulse is hereinafter considered with reference to its start of injection (SOI).

The position can be defined in term of distance between the start of injection (SOI) of each pulse from TDC. Alternatively, the position can be defined in term of distance (DWT—dwell time) between the start of injection (SOI) of each pulse form the end of the preceding injection. In the latter case, the position of the first after-injection pulse AIP1 is defined as the distance between its SOI and the main-injection I3, the position of the second after-injection pulse AIP2 is defined as the distance between its SOI and the first after-injection pulse AIP1, and so on.

In every case the distances in the pattern can be expressed in term of time [μs] or in term of angular position of the crankshaft [angular degree] from TDC.

According to an embodiment of the invention, the after-injected pulses are at least two, and preferably not more than five. The number of after-injected pulses is calibrated and regulated by ECU on the base of the engine operating parameters, preferably at least on the base of the engine speed. The feasible number of after-injection pulses depends also on entire injection pattern feasibility.

This means that some after-injection pulses have to be deleted by the ECU, if the available time slot between TDC and exhaust valves opening is not wide enough.

The ECU is therefore provided for correcting the number of after-injection pulses on the base of the above mentioned time slot. The total amount of after-injected fuel, which is injected by all the after-injection pulses AIP1-AIP3, is calibrated and regulated by ECU on the base of the engine operating parameters, preferably at least on the base of engine speed and engine load. ECU is also provided for correcting such total amount of after-injected fuel on the base of environmental conditions, for example on the base of ambient temperature and/or pressure.

Fuel quantity to be injected by each after-injection pulses AIP1-AIP3 is individually calibrated and regulated by the ECU on the base of the engine operating parameters, preferably at least on the base of engine speed and engine load. Such a regulation is independent for each pulse, so that different quantities of injected fuel are generally possible.

With reference to the crankshaft rotation, all after-injection pulse positions (SOI) in the pattern are in a range between the top dead center (TDC) of the piston and the opening of the exhaust valve, more preferably in a range between 30 and 100 angular degrees from TDC. The after-injection pulse positions (SOI) in the pattern are also individually calibrated and regulated by ECU on the base of the engine operating parameters, preferably at least on the base of engine speed and engine load. Such a regulation is independent for each pulse, so that different dwell times (DWT) between each couple of consecutive pulses are generally possible.

ECU is also provided for correcting the position (SOI) of after-injection pulses in the pattern on the base of environmental conditions, for example on the base of ambient temperature and/or pressure.

As shown in FIG. 3, the regenerating multi-injection pattern according to the invention comprises also a post-injection PI. The post-injection does not differ from the ones of the prior art, and can be eventually split in several consecutive post-injection pulses accordingly.

The start of injection (SOI) of the post-injection is near to the exhaust valves opening, so that the fuel does not burn inside the combustion chamber. As a matter of fact, post-injection generally starts after the crankshaft has covered 160 angular degrees from TDC of the piston. Therefore, post-injected fuel is ejected unburnt from the combustion chamber, and is channeled by the exhaust line to reach the diesel oxidation catalyst (DOC). The diesel oxidation catalyst is effective to oxidize such unburnt post-injected fuel, heating the exhaust gases which subsequently pass throw the DPF.

Another aspect of the invention refers to a computer program, comprising computer readable program means, which, when carried out on a computer, initiates an injection of an amount of fuel into a combustion chamber by means of at least two consecutive after-injection pulses (AIP1-AIP3), each of which starts after the piston has passed the top dead center (TDC) and sufficiently close to the latter for the fuel to burn at least partially inside the combustion chamber.

A further aspect of the inventions refers to a computer program product, comprising a computer program stored on a computer readable medium.

While the present invention has been described with respect to certain preferred embodiments and particular applications, it is understood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for regenerating a diesel particulate filter within a diesel engine system that comprises a combustion chamber defined by a reciprocating piston inside a cylinder, an exhaust valve for cyclically opening the combustion chamber towards an exhaust line, and the diesel particulate filter located in the exhaust line, the method comprising:
   injecting an amount of fuel into the combustion chamber with at least two consecutive after-injection pulses, each of which starts after the reciprocating piston has passed the top dead center and sufficiently near to the top dead center for the amount of fuel to burn at least partially inside the combustion chamber; and
   regulating the number of after-injection pulses, wherein the regulating of the number of after-injection pulses comprises correcting the number of after-injection pulses, at least in an available time slot between top dead center of the reciprocating piston and the instant when the exhaust valve opens the combustion chamber.

2. The method according to claim 1, further comprising regulating the total amount of fuel which is injected by all the at least two consecutive after-injection pulses.

3. The method according to claim 2, wherein the regulating the total amount of fuel is effected at least on an engine speed and an engine load.

4. The method according to claim 2, wherein the regulating the total amount of fuel comprises correcting the total amount of fuel on an environmental condition.

5. The method according to claim 1, wherein the regulating of the number of after-injection pulses is affected at least on an engine speed.

6. The method according to claim 1, further comprising regulating a fuel quantity to be injected for each of the at least two consecutive after-injection pulses independently of one another.

7. The method according to claim 6, wherein the regulating of the fuel quantity to be injected for each after-injection pulses is affected at least on an engine speed and an engine load.

8. The method according to claim 1, wherein each after-injection pulse occurs after the reciprocating piston passes the top dead center and before the exhaust valve is opened.

9. A non-transient computer readable medium embodying a computer program product, said program product comprising:
a computer program, the computer program configured to
initiate an injection of an amount of fuel into a combustion chamber by means of at least two consecutive after-injection pulses, each of which starts after a piston has passed the top dead center and sufficiently close to the latter for the amount of fuel to burn at least partially inside the combustion chamber, and
regulate the number of after-injection pulses including correcting the number of after-injection pulses, at least in an available time slot between top dead center of the reciprocating piston and the instant when the exhaust valve opens the combustion chamber.

10. The non-transient computer readable medium embodying a computer program product according to claim 9, wherein said computer program is further configured to regulate the position of each after-injection pulses in an injection pattern and comprises correcting such position on an environmental condition.

11. A control system for a diesel engine system comprising at least a combustion chamber defined by a reciprocating piston inside a cylinder, at least an exhaust valve for cyclically opening the combustion chamber towards an exhaust line, and a diesel particulate filter located in the exhaust line, the control system comprising:
a controllable injector adapted to inject a fuel into the combustion chamber, and
a controller adapted to control said controllable injector, said controller configured to
inject an amount of fuel into the combustion chamber with at least two consecutive after-injection pulses, each of which starts after the reciprocating piston has passed the top dead center and sufficiently near to the latter for the fuel to burn at least partially inside the combustion chamber, and
regulate the number of after-injection pulses including correcting the number of after-injection pulses, at least in an available time slot between top dead center of the reciprocating piston and the instant when the exhaust valve opens the combustion chamber.

12. The control system according to claim 11, said controller further configured to regulate the total amount of fuel which is injected by all the at least two consecutive after-injection pulses.

13. The control system according to claim 12, wherein regulating the total amount of fuel that is effected at least on an engine speed and an engine load.

14. The control system according to claim 12, wherein regulating the total amount of fuel comprises correcting the total amount of fuel on an environmental condition.

15. The control system according to claim 11, wherein regulating of the number of after-injection pulses is affected at least on an engine speed.

16. The control system according to claim 11, the controller is further configured to regulate a fuel quantity to be injected for each after-injection pulses independently for one another.

17. A method for regenerating a diesel particulate filter within a diesel engine system that comprises a combustion chamber defined by a reciprocating piston inside a cylinder, an exhaust valve for cyclically opening the combustion chamber towards an exhaust line, and the diesel particulate filter located in the exhaust line, the method comprising:
injecting an amount of fuel into the combustion chamber with at least two consecutive after-injection pulses, each of which starts after the reciprocating piston has passed the top dead center and sufficiently near to the top dead center for the amount of fuel to burn at least partially inside the combustion chamber; and
regulating a fuel quantity to be injected for each of the at least two consecutive after-injection pulses independently of one another.

18. The method according to claim 17, wherein the regulating of the fuel quantity to be injected for each after-injection pulses is affected at least on an engine speed and an engine load.

* * * * *